United States Patent [19]

de Jongh et al.

[11] 3,896,099
[45] July 22, 1975

[54] POLYMERIZATION OF ETHYLENICALLY UNSATURATED MONOMERS WITH A 1,1,2,2-TETRACARBOALKOXY-DIARYL-ETHANE

[75] Inventors: Hendrik A. P. de Jongh, Oss; Cornelis R. H. I. de Jonge, De Steeg, both of Netherlands

[73] Assignee: Akzo N.V., Arnhem, Netherlands

[22] Filed: Sept. 28, 1973

[21] Appl. No.: 401,604

Related U.S. Application Data

[63] Continuation-in-part of Ser. No. 159,949, July 2, 1971, abandoned.

[30] Foreign Application Priority Data

July 3, 1970 Netherlands.................. 7009925

[52] U.S. Cl. ... 260/93.5 R; 260/88.7 F; 260/94.2 R; 260/475 SC; 260/861
[51] Int. Cl......... C07c 69/76; C08f 7/04; C08f 3/74
[58] Field of Search........ 260/475 SC, 93.5 R, 88.7, 260/94.2 R, 88.7 F

[56] References Cited
UNITED STATES PATENTS 3,726,837    4/1973    de Jongh et al. ................ 260/93.5

OTHER PUBLICATIONS

Chemical Abstract – Vol. 33 – Nov. 1939.
Chemical Abstract – Vol. 54 – 4486 (1960).

Primary Examiner—Joseph L. Schofer
Assistant Examiner—Paul R. Michl
Attorney, Agent, or Firm—Stevens, Davis, Miller & Mosher

[57] ABSTRACT

A process for the free radical-initiated polymerization of ethylenically unsaturated monomers in the presence of a free radical initiator compound comprising a 1,1,-2,2-tetracarboalkoxy-diaryl-ethane.

4 Claims, No Drawings

POLYMERIZATION OF ETHYLENICALLY UNSATURATED MONOMERS WITH A 1,1,2,2-TETRACARBOALKOXY-DIARYL-ETHANE

This application is a continuation-in-part of U.S. Ser. No. 159,949, filed July 2, 1971, and now abandoned.

This invention relates to a process for carrying out chemical reactions initiated by radicals, using 1,2-diethane compounds as radical initiators.

Typical reactions initiated by radicals are substitution reactions, for instance, the chlorination of the side chain of toluene; alternating substitution and addition reactions, for instance, the coupling of cyclohexane to formaldehyde and polymerization reactions of ethylenically unsaturated molecules, such as styrene, methylmethacrylate, acrylonitrile, 2-vinylpyridine, 4-vinylpyridine, and vinyl acetate, optionally in the presence of resins such as polyester resins.

As radical initiators for carrying out these reactions, other diaryl-ethane compounds, for instance 1,2-dicyantetraphenylethane, and a compound referred to as hexaphenylethane have been described before (See German Patent Specification No. 1,216,877). However, as radical initiators for the polymerization of monomers, these compounds are not very active. Even in the case of a readily polymerizable compound such as styrene only 10% is converted into a polymer. In practice these compounds can only be used as radical scavangers, for instance, in the stabilization of polypropylene. Particularly at relatively high temperatures, the tetra-aryl glycols, which were also mentioned, give only a small yield expressed in grams of reaction product per gram of radical initiator. Moreover, the radical initiators applied are required to contain both an aromatic group and a hydroxyl group.

According to the instant invention, the radical initiator used in these reactions is a 1,2-diaryl-ethane compound which bears in the 1- and the 2-position, apart from the two aryl groups, only esterified carboxyl groups.

The compounds used in accordance with the invention may be represented by the following general formula:

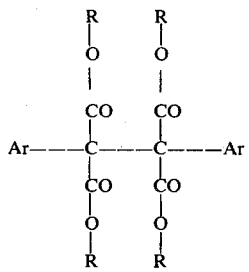

where Ar is a phenyl group substituted on the ortho- or ortho- and para-position by an alkyl group with 1 to 4 carbon atoms, a chlorine atom and/or a bromine atom, and R is a hydrocarbon group containing 1 to 24 carbon atoms.

The hydrocarbon groups R generally contain 1 to 24 carbon atoms and may be a branched or non-branched, saturated or nonsaturated alkyl group, for instance a methyl group, ethyl group, propyl group, butyl group, allyl group, isopropyl group, butenyl group, lauryl group, or a stearyl group; a cycloalkyl group, for instance, cyclopentyl or cyclohexyl; and aryl group, for instance, phenyl, tolyl, or naphthyl; or an aralkyl group, for instance a benzyl group.

The nature of the group R has no predominating influence on the activity of the compounds. The nature of R does influence the solubility and the melting point of the compounds, and this may sometimes be taken advantage of if the solubility of the compound to be used is to be adapted to the reaction medium.

If desired, mixtures of the radical initiators with other known radical initiators may be used, for instance, as solution in dibutyl phthalate.

For the purpose indicated, the use of the above-mentioned compounds has a number of advantages over the use of the known radical initiators.

Compared with the frequently used peroxides, they have the advantage that they act more specifically and do not give rise to undesirable side reactions, such as the formation of undesirable crosslinkages.

Over the use of azodinitriles or peroxides, they have the advantage that they do not cause the production of gas, which is inadmissible in a number of reactions initiated by radicals, nor do they lead to the formation of badly smelling compounds.

A particularly great advantage of the compounds to be used according to the invention is that they are insensitive to oxygen. This is very surprising in that many radical initiating, substituted ethanes are highly sensitive to oxygen, as a result of which they can only be used in a medium thoroughly freed from oxygen. The high resistance to oxygen of the radical initiators according to the invention is substantiated by the fact that when they are in a solution of, for instance, orthodichlorobenzene, they can be shaken for many hours at 150°C while in contact with oxygen without any oxygen being absorbed.

The compounds also have a high resistance to heat. For instance, while in a dilute solution, they can be boiled in chlorobenzene (boiling point 132°C) for several days without being subject to any change. By energy-rich radiation, the compounds can be rendered active at relatively low temperatures.

As the compounds according to the invention are not active at room temperature, they can at this temperature be introduced into a reaction mixture, after which the mixture can at any time be brought into reaction by heating. This is of particular importance in polymer chemistry, where there is often need of durable, moldable compositions which at a given moment may be polymerized further by heating, as is very often practiced in the case of unsaturated polyester resins. This constitutes an advantage over the commonly used method in which polymerization is effected by adding a "catalyst mixture" to the mass shortly before the shaping process, which addition is followed by the material starting to polymerize. Disadvantages of that method are the mixing shortly before use and the short duration used for the subsequent shaping process.

In the process according to the invention, compositions of radical initiators and polymerizable compounds, such as monomers, prepolymers, or polymers, which may still be cross-linked, may be processed into the desired shape and cured by heating. By curing is to be understood here polymerization in a broad sense which implies that it is not necessarily attended with the formation of cross-linkages. The compositions of radical initiators and polymerizable compounds can be processed into the desired shape by forming them into covering layers, casting them into molds, applying the compositions to glass fiber structures or to other reinforcement impregnating all kinds of materials, injection molding, extruding, vacuum forming, or any other forming technique.

The process according to the invention may advantageously be applied in several stages; for instance, a monomer may be mixed with the radical initiators according to the invention, and polymerization may be started by heating. The polymerization process may be interrupted by reducing the temperature. At that stage, the polymerization product consists of a mixture of monomer and polymer (in the present description, also referred to as prepolymer) which upon being formed into the desired shape may be further polymerized. Prior to further polymerization, the prepolymer may, of course, be mixed with compounds which in the further polymerization serve as cross-linking agents.

As examples of compounds that may be polymerized according to the invention may be mentioned styrene; α-methyl styrene; acryl compounds such as methylmethacrylate, acrylamide, methacrylamide, acrylonitrile, methacrylonitrile; 2-vinyl pyridine, 4-vinyl pyridine, vinyl acetate, divinyl benzene, N-vinyl pyrrolidone, butadiene, isoprene, chloroprene, diallyl phthalate, diallyl carbonate, diallyl fumarate, or mixtures of the aforementioned compounds.

Polymerization reactions according to the invention may be carried out by one of the known techniques. For instance, the monomer or the monomer mixture as such may be polymerized. Or polymerization may take place in a solution, a suspension, or an emulsion, preferably in bulk or in solution. For those skilled in the art, these techniques need not be elucidated. If desired, the process may be carried out in the presence of usual additives. The radical initiators are applied in usual amounts, for instance in amounts of 0.01 to 5% by weight, based on the amount of the compounds to be reacted. The reaction temperature is usually between +40° and +200° C.

The radical initiators to be used according to the invention may be prepared in the manner usual for corresponding compounds.

It has been found that compounds to be used in the process according to the invention may be prepared in a particularly simple manner if a compound having the formula as follows is subjected to an oxidative coupling reaction.

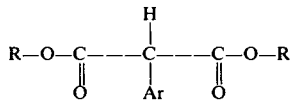

where Ar represents an ortho or ortho- and parasustituted aryl group with 6 to 30 carbon atoms, and R is a hydrocarbon group with 1 to 24 carbon atoms.

Oxidative coupling reactions are known in themselves. They may be carried out by using an oxidation agent such as silver oxide, iodine, or organic peroxides, for instance, di-tert. butyl peroxide. For the sake of simplicity, it is in practice preferred to use potassium permanganate or potassium ferricyanide. The temperature to be used is usually between −40° and +130°C; by preference, it is at about room temperature.

The invention will be further explained in a number of examples. In these examples, use is made of the compounds having the general formula:

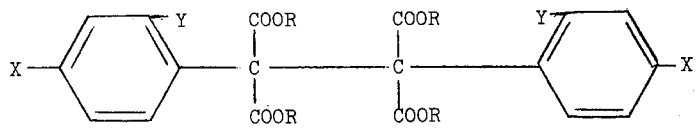

where X, Y and R have the meaning indicated in the following list.

| Radical Initiator number | X | Y | R |
|---|---|---|---|
| 1 | CH₃ | H | CH₃ |
| 2 | CH₃ | H | n—C₁₂H₂₅ |
| 3 | CH₃ | H | n—C₁₈H₃₇ |
| 4 | CH₃ | H | n—C₂₄H₄₉ |
| 5 | CH₃ | H | CH₂C₆H₅ |
| 6 | C₂H₅ | H | CH₃ |
| 7 | n—C₄H₉ | H | CH₃ |
| 8 | Cl | H | CH₃ |
| 9 | Cl | H | n—C₄H₉ |
| 10 | Cl | H | n—C₁₈H₃₇ |
| 11 | Br | H | CH₃ |
| 12 | Br | H | n—C₁₂H₂₅ |
| 13 | CH₃ | CH₃ | CH₃ |
| 14 | Cl | CH₃ | n—C₁₈H₃₇ |
| 15 | Cl | Cl | n—C₁₂H₂₅ |
| 16 | Br | CH₃ | n—C₁₂H₂₅ |
| 17 | Br | Br | n—C₁₈H₃₇ |

EXAMPLE I

In a reaction vessel, 100 milliliters of styrene are mixed with 250 milligrams of each of the radical initiators mentioned in Table 1. Also, controls respectively without initiator or with the known initiator di-tert. butyl peroxide, are used. The resulting mixture is heated to 120°C, which temperature is maintained for 3 hours. Every hour, the percentage by weight of styrene that has polymerized is determined. This is done by taking a sample from which the polystyrene is isolated by precipitation with methanol, followed by drying and weighing. The results obtained with different radical initiators are listed in Table 1.

TABLE I

| Radical Initiator | 1 hr | Yield in % after 2 hr | 3 hr |
|---|---|---|---|
| None (blank) | 15 | 29 | — |
| Di-tert. butyl peroxide | 15 | 34 | — |
| No. 1 | 43 | 78 | 91 |
| No. 3 | 31 | 68 | 78 |
| No. 5 | 39 | 74 | 86 |
| No. 7 | 41 | 77 | 92 |
| No. 8 | 28 | 50 | 69 |
| No. 11 | 30 | 63 | 78 |
| No. 12 | 19 | 45 | 65 |
| No. 13 | 41 | 75 | 90 |
| No. 14 | 16 | 37 | 59 |
| No. 16 | 23 | 46 | 67 |
| No. 17 | 9 | 28 | 51 |

EXAMPLE II

Example I is repeated, but a polymerization temperature of 150° C is maintained and the radical initiators mentioned in Table 2 are used. The yields are determined after 30 minutes and after 1 and 2 hours. The results are listed in Table 2. For comparison, also the results are given of the experiment repeated in such a way that either no radical initiator is used or tetraphenyl glycol or di-tert.butyl peroxide is used as a radical initiator.

TABLE 2

| Radical Initiators | Yield in % after | | |
|---|---|---|---|
|  | 30 m | 1 hr | 2 hr |
| None (blank) | 14 | 23 | 70 |
| Tetraphenyl glycol | 43 | 58 | 86 |
| Di-tert.butyl peroxide | 58 | 90 | 96 |
| No. 1 | 63 | 96 | 99 |
| No. 2 | 51 | 94 | 98 |
| No. 4 | 48 | 95 | 98 |
| No. 6 | 59 | 93 | 99 |
| No. 8 | 47 | 94 | 98.5 |
| No. 9 | 47 | 95 | 99 |
| No. 10 | 45 | 91 | 98 |
| No. 13 | 61 | 97 | 99 |
| No. 14 | 46 | 89 | 98 |
| No. 15 | 44 | 91 | 97 |
| No. 16 | 43 | 92 | 99 |

EXAMPLE III

In this example, 100 milliters of a vinyl compound listed in Table 3 are mixed with 250 milligrams of the radical initiator Nr. 1. In each case the mixture is heated to 120°C, after which every hour the conversion is determined in a manner similar to that described in Example I. The results of these experiments are shown in Table 3.

Table 3

| Vinyl compound | Conversion in % after | | | | |
|---|---|---|---|---|---|
|  | 1 hr | 2 hr | 3 hr | 4 hr | 5 hr |
| Methyl methacrylate | 91 | 98.5 | 99 | — | — |
| Vinylacetate | 41 | 91 | 98.5 | — | — |
| Acrylonitrile | 96 | 99.5 | — | — | — |
| Styrene | 43 | 78 | 91 | 99 | — |

EXAMPLE IV 25 milliliters of styrene are mixed with 300 milliliters of toluene and 0.25 gram of radical initiator no. 7 is added to the mixture. After stirring for 3 hrs. at 112°C the mixture becomes viscous and after 24 hrs. the mixture is precipitated in an equal volume of methanol. The precipitated polymer (22.1 g) is isolated by filtration and dried in vacuo.

EXAMPLE V

In a glass tube 25 grams of an unsaturated polyester (trade name Ludopal P6) are mixed with 0,25 gram of radical initiator no. 2 and heated to the temperature as indicated in Table 4.

Table 4

| Heating temp. | (°C) | 80° | 100° |
|---|---|---|---|
| Gelling time | (in min.) | 4.2 | 1.5 |
| Curing time | (in min.) | 9.9 | 1.5 |
| Peak temperature | (°C) | 205 | 228 |

What is claimed is:

1. In the process for the free radical-initiated polymerization of ethylenically unsaturated monomers, the improvement which comprises using as the free radical initiator a 1,1,2,2-tetracarboalkoxy-diaryl ethane of the formula

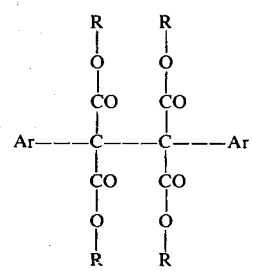

where Ar is a phenyl group substituted on the ortho-or ortho- and para-position by an alkyl group with 1 to 4 carbon atoms, a chlorine atom and/or a bromine atom, and R is a hydrocarbon containing 1 to 24 carbon atoms in an amount of from about 0.01 part to about 5 parts per 100 parts of reactants.

2. The process of claim 1 wherein the unsaturated monomer is selected from the group consisting of styrene, α-methyl stryrene, methyl methacrylate, acrylamide, methacrylamide, acrylonitrile, methacrylonitrile, 2-vinyl pyridine, 4-vinyl pyridine, vinyl acetate, divinyl benzene, N-vinylpyrrolidone, butadiene, isoprene, chloroprene, diallyl phthalate, diallyl carbonate and diallyl fumarate and, optionally, are mixed with an unsaturated polyester resin.

3. The process of claim 1 wherein the free radical initiator is 1,1,2,2-tetracarbomethoxy - 1,2-di p-methylphenyl ethane.

4. The process of claim 1 wherein the free radical initiator is 1,1,2,2-tetracarbomethoxy-1,2-di p-chlorophenyl ethane.

* * * * *

UNITED STATES PATENT AND TRADEMARK OFFICE
CERTIFICATE OF CORRECTION

PATENT NO. : 3,896,099
DATED : July 22, 1975
INVENTOR(S) : Hendrik A. P. de Jongh et al It is certified that error appears in the above-identified patent and that said Letters Patent are hereby corrected as shown below:

Claim 1, line 33, after "hydrocarbon", insert ---group---.

Signed and Sealed this second Day of December 1975

[SEAL]

Attest:

RUTH C. MASON
Attesting Officer

C. MARSHALL DANN
Commissioner of Patents and Trademarks